United States Patent [19]

Shioiri et al.

[11] Patent Number: 5,026,536

[45] Date of Patent: Jun. 25, 1991

[54] HYDROGEN PRODUCTION FROM HYDROCARBON

[75] Inventors: Tomonori Shioiri, Kanagawa; Shinichi Satake; Yasuo Sekido, both of Yokohama; Tokuo Fujisou, Yokosuka; Akira Obuchi; Hideharu Kato, both of Yokohama, all of Japan

[73] Assignees: Nippon Oil Co., Ltd.; Petroleum Energy Center, both of Tokyo, Japan

[21] Appl. No.: 452,197

[22] Filed: Dec. 18, 1989

[30] Foreign Application Priority Data

Dec. 20, 1988 [JP] Japan .................................. 63-321495
Feb. 2, 1989 [JP] Japan ...................................... 1-24422

[51] Int. Cl.$^5$ .............................................. C01B 3/26
[52] U.S. Cl. ..................................... 423/652; 423/653; 423/654
[58] Field of Search ....................... 423/653, 652, 654

[56] References Cited

U.S. PATENT DOCUMENTS

| 1,863,681 | 6/1932 | Al ............................... 423/653 |
| 1,921,856 | 8/1933 | Wietzel et al. ............... 423/653 |
| 3,737,291 | 6/1973 | Lhonore et al. ............. 423/653 |

FOREIGN PATENT DOCUMENTS

| 2141875 | 3/1973 | Fed. Rep. of Germany ...... 423/653 |
| 35403 | 2/1988 | Japan ................................... 423/653 |

Primary Examiner—Wayne A. Langel
Attorney, Agent, or Firm—Bucknam and Archer

[57] ABSTRACT

A process is disclosed for producing hydrogen of high purity from hydrocarbons. A selected hydrocarbon feed is contacted with a nickel-containing sorbent of a specified composition at below 50 kg/cm$^2$G and at from 150° to 500° C. The hydrocarbon feed thus treated is further reformed with a catalyst of a specified composition.

17 Claims, No Drawings

HYDROGEN PRODUCTION FROM HYDROCARBON

BACKGROUND OF THE INVENTION

1. Field of the Invention

This invention is directed to the production of hydrogen from hydrocarbons and more particularly to a process for deriving hydrogen from a hydrocarbon feed in which the starting material is subjected to stripping of its sulfur contents on a nickel sorbent and subsequently to reforming reaction on a steam reforming catalyst.

2. Description of the Prior Art

Hydrogen finds extensive application for instance as a starting material, a refining agent, a fuel and the like and has its source of supply from a variety of methods including electrolysis of water and steam reforming, partial oxidation, decomposition or dehydrogenation of hydrocarbons and alcohols. Hydrogen obtainable by electrolyzing water is highly pure, though costly, and hence applicable to special usage as in physical and chemical experiments. Hydrogen for industrial use as starting materials or product refiners is in most cases produced by steam-reforming or partially oxidizing relatively cheap, readily available materials and in such instance steam reforming of light hydrocarbons and alcohols is more often effected than partial oxidation of coals and heavy residual oils. Such light hydrocarbons and alcohols include for example methane, ethane, propane, butane and mixtures thereof and gases containing these hydrocarbons, light naphtha, heavy naphtha and methanol.

In general, hydrocarbons contain sulfur compounds which tend to adversely affect steam reforming catalysts. It is necessary therefore to remove sulfur contents from the hydrocarbon prior to reforming reaction as the catalyst is highly sensitive to those sulfur compounds.

A hydrogenative desulfurization process is known for removing sulfur compounds from hydrocarbons in the presence of a hydrogen-containing gas with the use of a catalyst such as cobalt-molybdenum, nickel-molybdenum, nickel-cobalt-molybdenum, nickel-tungsten and the like and under elevated temperature and pressure conditions. Hydrogen sulfide thus formed is subsequently removed by adsorption on to a metal oxide such as zinc oxide, copper oxide, manganese oxide or iron oxide. Hydrogenative desulfurization differs in reaction conditions from steam reforming, entailing the disposition of reaction vessels, control devices, heat exchangers and other necessary facilities for use in desulfurization at a position upstream of and independently of the steam reformer. This leaves the problem that the whole apparatus gets bulky with tedious control.

With the prior method of adsorbing hydrogen sulfide with metal oxides, it has been difficult to remove sulfur compounds other than hydrogen sulfide to a level of concentration tolerable to reforming catalysts. These metal oxides are liable to invite a sharp decline in adsorptivity on contact with steam in reforming reaciton.

It has also been proposed that a nickel sorbent be used to remove traces of sulfur compounds from naphtha fractions in a naphtha reforming process for gasoline production, thereby maintaining a platinum catalyst fully activable in a subsequent reaction. In the chemical industry such sorbent has been utilized to adsorb a limited amount of sulfur contained in organic compounds as starting materials so that side reaction is alleviated during preparation of the compounds intended. The present inventors disclose certain adsorption methods in Japanese Patent Laid-Open Publication Nos. 63-35403, 1-188404, 1-188405 and 1-188406, which methods serve to remove sulfur contents from a kerosine fraction under specific conditions. However, the methods of Publication Nos. 63-35403, 1-188404 and 1-188405 have been found not still satisfactory because increased quantity of a nickel sorbent is required to achieve a 0.2 ppm level over prolonged length of time. With the method of Publication No. 1-188406, hydrogen-containing gas often outgoes together with carbon monoxide (CO) and carbon dioxide ($CO_2$) from a desulfurization reactor with the results that CO and $CO_2$ will react with $H_2$ in the presence of a nickel sorbent and thus generate gaseous methane, leading to hazardous heat buildup.

As hydrogen-containing gas necessary for reforming reaction, part of reformed gas derivable from that reaction is usually recycled in which CO and $CO_2$ are contained. This recycle gas is obtained substantially free from CO and $CO_2$ only when passed through carbon monoxide modifiers and carbonate removers arranged downwardly of the steam reformer. Contact of a nickel solvent with a hydrocarbon at a temperature above 40° C. at an inlet of the reformer has been experimentally proved susceptible to too much carbonaceous deposit for practical purposes.

SUMMARY OF THE INVENTION

The present invention seeks to provide a novel process for producing hydrogen of high purity from hydrocarbons which will eliminate the foregoing drawbacks of the prior art methods and which will enable the hydrocarbon to react with a nickel sorbent in the presence of steam and without formation of methane. More specifically, the invention resides in the provision of a process for hydrogen production which will exhibit reduced carbonaceous deposition on and prolonged service of the nickel sorbent without involing added gas-liquid separator and heat exchanger facilities.

As will become better understood from the following description, the invention provides a process for producing hydrogen from hydrocarbons, which comprises contacting a hydrocarbon feed with a nickel-containing sorbent in the presence of steam and hydrogen-containing gas at a pressure of lower than 50 kg/cm$_2$G, at a temperature of 150° to 500° C. and at a GHSV of 100 to 5,000 hr$^{-1}$ or at an LHSV of 0.1 to 10 hr$^{-1}$ and subsequently treating the resulting reaction mixture with a steam reforming catalyst.

DETAILED DESCRIPTION OF THE INVENTION

Hydrocarbons eligible for purposes of the present invention are gaseous or liquid at room temperature and at atmospheric pressure. Gaseous hydrocarbons include methane, ethane, propane, butane and the like singly or in combination and natural gas, whereas liquid hydrocarbons include light naphtha fractions, heavy naphtha fractions, kerosine fractions and the like and mixtures thereof. Particularly preferred are natural gases, light and heavy naphthas and kerosine fractions.

Naphthas usually have a content of sulfur compounds of not more than 300 ppm by weight, and kerosine fractions have a similar content of smaller than 2,000 ppm by weight. Sulfur contents in hydrocarbons suitable for the invention are not specifically restrictive but economically feasible in an amount of not more than 150 ppm by weight and preferably less than 100 ppm by weight and more preferably up to 10 ppm by weight.

Nickel sorbents according to the invention preferably contain nickel in an amount of 30 to 70% by weight and may further contain small quantities of copper, chromium, zirconium, magnesium and other metal components. Suitable carriers are selected for example from silica, alumina, silica-alumina, titania, zirconia, zinc oxide, clay, diatomaceous earth and other inorganic refractory oxides. The nickel-containing sorbent preferably takes the form of a tablet, pellet or sphere having a size of 0.5 to 10 mm. To avoid fire hazard or otherwise improve surface stability, the sorbent may be treated by partial oxidation of its nickel component or by adsorption with gaseous carbon dioxide. It may be subjected, prior to use, to hydrogen reduction at from 150° to 400° C. or to carbon dioxide removal by an inert gas.

Hydrogen-containing gas may be supplied from an external source, but may more conveniently be replaced with a portion of hydrogen which is generated according to the invention and which can be recycled. A reformed gas from a steam reformer is made up of $CO_2$, CO, $H_2O$, $CH_4$ and traces of hydrocarbons of two or more carbon atoms normally in thermodynamic equilibrium and may be used either as generated or after removal of materials other than hydrogen. This varies depending upon the end use of hydrogen. In hydrogen-containing gas to be recycled, therefore, hydrogen may be contained in an amount of 30% or more.

A selected hydrocarbon as a starting material may be contacted with a nickel sorbent in the presence of hydrogen-containing gas and steam and under reaction conditions at a pressure of lower than 50 kg/cm$^2$G and preferably from atmospheric to 30 kg/cm$^2$G and at a temperature of 150° to 500° C. and preferably from 250° to 500° C. Lower pressures of 10 kg/cm$^2$G or below are clear of the provisions of the high pressure gas ordinance and easy and simple to handle. The hydrocarbon if gaseous should be in the range of 100 to 5,000 hr$^{-1}$ in gas per hour space velocity (GHSV) and if liquid in the range of 0.1 to 10 hr$^{-1}$ and preferably from 1 to 5 hr$^{-1}$ in liquid per hour space velocity (LHSV). The hydrogen to hydrocarbon ratio preferably ranges from 0.05 to 1.0 Nm$^3$ in terms of pure hydrogen/kg of hydrocarbon. Steam may be used in a steam to carbon ratio of 0.1 to 7 mol/atom and preferably 0.2 to 5 mol/atom. Smaller ratios of steam than 0.01 mol/atom would not be effective in reforming the starting hydrocarbon and greater ratios than 7 mol/atom would render the nickel sorbent less active.

The hydrocarbon and steam may be contacted with a nickel sorbent by upward or downward passage through the desulfurization reactor in which has previously been packed with that sorbent. The hydrocarbon upon treatment has a low sulfur content of 0.2 ppm by weight or below and thus suits steam reforming according to the invention.

The nickel sorbent may be packed in a vessel located in contiguous relation to, or at an inlet of, the steam reformer and should importantly be contacted with a given hydrocarbon in the presence of hydrogen-containing gas and steam. The resultant reaction mixture should thereafter be contacted as prepared with a steam reforming catalyst with or without the addition of steam.

Suitable reforming catalysts contain, as an active metal, nickel in an amount of 5 to 50% by weight as an oxide and preferably from 10 to 35% by weight and may also contain ruthenium. As carriers for this catalyst there may suitably be used those specified in connection with the nickel sorbent. A promoter may be employed which is made up such as of an oxide of an alkaline metal, an alkaline earth metal or a rare earth metal and which is added in an amount of less than 10% to prevent carbon precipitation.

Hydrocarbon reforming reaction may preferably be effected at a temperature of 400° to 600° C. at a catalyst bed inlet and at from 600° to 850° C. at a catalyst bed outlet, at a pressure of below 50 kg/cm$^2$G and preferably at from atmospheric to 30 kg/cm$^2$G and more preferably at lower than 10 kg/cm$^2$G, at pure hydrogen-hydrocarbon ratio of 0.05 to 1.0 Nm$^3$/kg and at a steam-carbon ratio of 2.5 to 7 mol/atom. A reformed gas is usually entrained with $CO_2$, CO, $CH_4$ and $H_2O$ and may be further refined if necessary. CO may be removed or reduced by contacting the reformed gas with a high-temperature modifying catalyst such as $Fe_2O_3$-$Cr_2O_3$ at from 300° to 500° C. and/or with a low-temperature modifying catalyst such as CuO-ZnO at from 150° to 250° C. Where CO is required to reduce to 0.1% by volume or below, further treatment may be done by a nickel catalyst-filled methanator. $CO_2$ may be removed by the use of a basic material such KOH. Hydrogen-containing gas on refining is put to use, but may in part be recycled to an inlet of the nickel sorbent bed.

Hydrogenative desulfurization and hydrogen sulfide adsorption may if necessary be carried out prior to treatment with a nickel sorbent. In this instance a selected hydrocarbon is at first contacted with a desulfurizing catalyst packed usually on top of the desulfurization reactor. Catalysts used for this reaction are composed preferably of an active metal such as of cobalt-molybdenum, nickel-molybdenum, nickel-cobalt-molybdenum or nickel-tungsten, which metal is supported on a carrier such as alumina or an alumina-based oxide. Cobalt or nickel may preferably be carried as an oxide in an amount of 2 to 7% by weight and molybdenum or tungsten as an oxide in an amount of 8 to 25% by weight. This catalyst is from 0.7 to 5 mm in diameter and 10 mm or shorter in length. It may be extruded or pelletized into a circular, trefoiled or quotrefoiled shape as seen diametrically cross-sectionally. The catalyst is reduced by hydrogen and pre-sulfurized by a sulfurizing agent either before or after it is packed in a desulfurization reactor. After this pre-treatment, the reactor is charged with a hydrocarbon and hydrogen-containing gas under specified conditions. As hydrogen-containing gas a portion of hydrogen is conveniently utilized which is produced and recycled according to the invention as noted in steam reforming.

Desulfurization conditions may be at a pressure of lower than 50 kg/cm$^2$G and preferably 10 kg/cm$^2$G or below, at a temperature of 250° to 400° C., at an LHSV of 0.27 to 7 hr$^{-1}$ and at a pure hydrogen-hydrocarbon ratio of 0.02 to 1.0 Nm$^3$/kg.

Hydrogen sulfide derived by desulfurization should be removed with the use of an adsorbent. Adsorbents eligible for the invention are basic in nature, and they include sodium hydroxide, calcium hydroxide, mono-ethanolamine, isopropylamine, ZnO, CuO, $Fe_2O_3$-$Cr_2O_3$, ZnO-CuO, ZnO-$MoO_3$, ZnO-$Fl_2O_3$ and the like. Solid compounds such as ZnO are preferred for easy handling and reasonable economy particularly where sulfur contents in hydrocarbons are held below 150 ppm by weight as contemplated under the invention. The hydrogen sulfide adsorbent may be introduced together with the desulfurization catalyst into the same reactor in which the adsorbent is placed at a reactor lower outlet and the catalyst at a reactor upper inlet. Alternatively, the adsorbent may be supplied separately from the catalyst with the former agent packed in a downward reactor and with the latter catalyst fed in an upstream reactor In the case of separate supply, the same reaction conditions should be followed.

The following examples are provided to further illustrate the invention.

EXAMPLE 1

A stainless tube of 20 mm in inside diameter was packed with 100 ml of a nickel-diatomaceous earth sorbent of 59% by weight of Ni, followed by pretreatment with nitrogen gas at 200° C. and by subsequent heating at 430° C. Into the tube was incorporated a naphtha feed of 34° to 170° C. in boiling point, 0.656 g/cc in density and 43 ppm by weight of sulfur together with steam and hydrogen-containing gas of 74% in $H_2$, 24% in $CO_2$, 1% in Co and 1% in $CH_4$ each by volume. The pressure was at 2 kg/cm²G, the hydrogen-naphtha ratio at 0.15 l/g, the steam-carbon ratio at 3.5 mol/atom and the LHSV at 0.35 hr$^{-1}$ (35 ml/hr). The temperature rised to 450° C. at a sorbent bed outlet, meaning that the naphtha feed fully decomposed into a gas stream and a steam stream. The gas stream, composed of 40.1% in $H_2$, 20.5% in $CO_2$, 0.6% in CO and 38.9% in $CH_4$ each by volume, was reduced in its sulfur content to below 0.1 ppm by volume. It was taken as prepared into a stainless reformer of 20 mm in inside diameter in which were placed at upper and lower positions two commercial grades of reforming catalysts in their respective amounts of 17.5 ml. One grade contained 21% by weight of NiO and the other 10% by weight of NiO. Heating at 450° C. at a catalyst bed inlet and at 800° C. at a catalyst bed outlet gave a hydrogen-containing gas having 71.8% of $H_2$, 14.2% of $CO_2$, 12.8% of CO and 1.2 % of $CH_4$ each by volume on a dry basis. This gas after being cooled to 200° C. was supplied, at a GHSV of 1,000 hr$^{-1}$ on a dry basis, on to a commercial grade of a low-temperature modifying catalyst after which there was obtained hydrogen of 74% in $H_2$, 24% in $CO_2$, 1.0% in CO and 1.0% in $CH_4$ each by volume.

After a lapse of 600 hours following the initiation of naphtha feed, the sulfur content in the gas resulting from the sorbent bed outlet exceeded 0.1 ppm by volume. At that time feeding was brought to an end. This is interpreted to indicate that commercially available naphtha of 0.5 ppm by weight of sulfur, as against the 43 ppm naphtha now used for accelerated test, can be run even for 50,000 hours or longer under the same reaction conditions.

EXAMPLE 2

A stainless tube of 20 mm in inside diameter was filled with 40 ml of a nickel-silica sorbent of 38% by weight of Ni. Reduction was done with hydrogen at 200° C. and then heating at 400° C. The tube was charged with a commercial grade of JIS No. 1 kerosine together with steam and hydrogen-containing gas of the same composition as was in Example 1. Reaction conditions were at a pressure of 9 kg/cm²G, at a hydrogen-kerosine ratio of 0.5 l/g, at a steam-carbon ratio of 4.5 mol/atom and at an LHSV of 1 hr$^{-1}$ (40 ml/hr). The tube showed a temperature of 430° C. at its sorbent bed outlet so that treated kerosine had a sulfur content below 0.1 ppm by volume. Into a stainless reformer of 20 mm in inside diameter was incorporated the resulting gas stream, followed by contact with 60 ml of a reforming catalyst packed in that reformer and composed of 35% by weight of NiO. On heating at 430° C. at an inlet and at 780° C. at an outlet there was obtained hydrogen with 69.7% of $H_2$, 16.5% of $CO_2$, 12.5% of CO and 1.3% of $CH_4$ each by volume.

Kerosine feeding was discontinued after a lapse of 230 hours for reasons noted in Example 1. A long run of about 17,000 hours has been found effectively possible with a kerosine feed of 0.5 ppm by weight of sulfur.

EXAMPLE 3

A stainless tube of 20 mm in inside diameter was filled with 25 ml of a nickel-diatomaceous earth sorbent of 63.7% by weight of Ni. Nitrogen treatment was effected at 200° C., and the temperature was elevated to 450° C. Natural gas was thereafter brought into contact with the sorbent also with the addition of steam and hydrogen-containing gas. The natural gas used was composed of 90% of methane, 4% of ethane, 4% of propane, 2% of butane and 4 ppm of sulfur each by volume and the hydrogen-containing gas of the same nature as in Example 1. Contact conditions were at a pressure of 1 kg/cm²G, at a hydrogen-natural gas ratio of 0.7 l/l, at a steam-carbon ratio of 3.0 mol/atom and at a GHSV of 2,000 hr$^{-1}$ (50 l/hr). Treated natural gas was reduced in its sulfur content to below 0.1 ppm by volume at 470° C. at a sorbent bed outlet. This gas stream was contacted with 50 ml of a commercial reforming catalyst packed in a stainless reformer of 20 mm in inside diameter and made up of 9% by weight of NiO and also of 4% by weight of La as a promoter. Heating the catalyst bed inlet at 470° C. and the catalyst bed outlet at 820° C. produced hydrogen having a composition of 74.2% of $H_2$, 11.3% of $CO_2$, 14.1% of CO and 0.4% of $CH_4$ each by volume.

Performance was evaluated in a manner described in Example 1. Satisfactory results were obtained even over 2,400 hours. A run as long as about 9,500 hours has been proved feasible with a GHSV of 500 hr$^{-1}$ in place of the same velocity of 2,000 hr$^{-1}$.

COMPARATIVE EXAMPLE 1

In a stainless tube of a 20 mm-inside diameter was supplied 40 ml of a Ni-$Al_2O_3$-MgO sorbent with a nickel content of 35% by weight. The sorbent after being nitrogen-treated was heated at 440° C. and contacted with 40 ml of a naphtha fraction of 34 ° to 170° C. in boiling point, 0.655 g/cc in density and 39 ppm by weight of sulfur. The pressure was at 2 kg/cm²G, the hydrogen-naphtha ratio at 0.15 l/g and the LHSV at 1 hr$^{-1}$ (40 ml/hr). Hydrogen-containing gas used was as specified in Example 1.

This control system resulted in a failure as it showed a sharp rise in reaction temperature immediately after the test commenced. The reason was that CO or $CO_2$ in the hydrogen-containing gas reacted with $H_2$ to transfrom into methane. This will contribute to the reason why the inventive process requires the presence of steam. Naphtha outgoing from the system slightly smelt like hydrogen sulfide. The majority of sulfur contents was found to be discharged as hydrogen sulfide without arrest on the nickel-containing sorbent.

EXAMPLE 4

A stainless desulfurization reactor of a 20 mm-inside diameter was filled at its upper portion with 40 ml of a desulfurization catalyst and at its lower portion with 40 ml of a hydrogen sulfide adsorbent. The catalyst consisted of 3.0% of NiO, 22% of $MoO_3$ and 75% of $Al_2O_3$ each by weight. ZnO was used as the adsorbent. Treatment was carried out with a commercial kerosine grade of 74% of $H_2$, 24% of $CO_2$, 1% of CO and 1% of $CH_4$ each by volume, 90 ppm by weight of sulfur, 50° C. in flash point, 0.790 (15/4° C.) in density and 153° to 260° C. in boiling point. Treated kerosine was reduced in its sulfur content to 4 ppm by weight. A mixture of treated kerosine and hydrogen-containing gas was added with steam at a temperature of 183° C. and at a steam-carbon ratio of 1.4 mol/atom, followed by downward passage through the reactor packed further with 20 ml of a sorbent of 63.7% by weight of Ni. The pressure was at 9 kg/cm$^2$G, the inlet temperature at 250° C. and the outlet temperature at 280° C. Treated kerosine was maintained in its sulfur content at below 0.1 ppm by weight for a passage of time as long as 10,125 hours.

The resulting gaseous mixture of kerosine, hydrogen-containing gas and steam was further treated with steam at a steam-carbon ratio of 5.0 mol/atom, followed by heat exchange and by subsequent introduction into a steam reformer having packed 115 ml of a reforming catalyst of 34 by weight of NiO. Reaction conditions were at a pressure of 8 kg/cm$^2$G, at an inlet temperature of 500° C. and at an outlet temperature of 800° C. A gas stream was obtained which was composed of 72.0% in $H_2$, 14.2% in $CO_2$, 12.8% in CO and 1.0% in $CH_4$ each by volume on a dry basis. This stream was heat-exchanged to cool at 200° C. and contacted at a GHSV of 1,000 hr$^{-1}$ with a commercial grade of a low-temperature modifying catalyst of CuO-ZnO-$Al_2O_3$ after which there was produced hydrogen of 74% in $H_2$, 24% in $CO_2$, 1.0% in CO and 1.0% in $CH_4$ each by volume.

With the inventive process hydrogen is efficiently producible with kerosine of 90 ppm by weight of sulfur even over about 10,000 hours.

EXAMPLE 5

The same grade of kerosine and conditions of desulfurization as in Example 4 were used to reduce the sulfur content to 4 ppm by weight. A mixture of treated kerosine and hydrogen-containing gas was exposed to steam at a temperature of 183° C. and at a steam-carbon ratio of 0.4 mol/atom, followed by contacting with a nickel-containing sorbent in a stainless desulfurization reactor. The nickel content and the amount of the sorbent was 37.7 by weight and 40 ml, respectively. Reaction was effected at a pressure of 9 kg/cm$^2$G, at an inlet temperature of 280° C. and at an outlet temperature of 320° C. The sulfur content of treated kerosine was held at below 0.1 ppm by weight for a length of time of 9,000 hours.

The above reaction mixture after being subjected to steaming at a steam-carbon ratio of 5.0 mol/atom was reacted under the same conditions as in Example 4, thereby providing hydrogen of 74% in $H_2$, 24% in $CO_2$, 17 in CO and 1% $CH_4$ each by volume.

The indication is that hydrogen production is highly feasible as long as about 9,000 hours.

EXAMPLE 6

In a stainless desulfurization reactor of a 20 mm-inside diameter were packed 80 ml of a desulfurization catalyst and 80 ml of a hydrogen sulfide adsorbent. The catalyst and adsorbent were as used in Example 4, and the desulfurization conditions of Example 1 were followed except that the magnitude of LHSV was changed to 0.5 hr$^{-1}$. Contact-treated was a commercial grade of kerosine of 38 ppm by weight of sulfur, 52° C. in flash point, 0.7919 (15/4° C.) in density and 149° to 250° C. in boiling point. Treated kerosine was reduced in its sulfur content to 0.68 ppm by weight.

The resulting gaseous mixture was further steam-treated at a temperature of 183° C. and at a steam-carbon ratio of 4.5 mol/atom and subsequently heat-exchanged to contact with 40 ml of a sorbent containing 59.6% by weight of Ni. The pressure was at 9 kg/cm$^2$G, the inlet temperature at 450° C. and the outlet temperature at 480° C. The sulfur content in kerosine was held at below 0.1 ppm by weight for extended time of 8,100 hours. The reaction mixture as treated was allowed to pass through a steam reformer in which two different reforming catalysts were filled in their respective amounts of 40 ml at upper and lower portions. One catalyst contained 21.0% by weight of NiO and the other 10.0% by weight of NiO. Reaction was done at a pressure of 8 kg/cm$^2$G, at an inlet temperature of 480° C. and at an outlet temperature of 800° C., thereby providing hydrogen of 71.7% in $H_2$, 10.6% in CO, 0.4% in $CH_4$ and 17.3% in $CO_2$ each by volume on a dry basis.

As is apparent from the test results, hydrogen production is possible for about 8,000 hours.

COMPARATIVE EXAMPLE 2

A stainless desulfurization reactor of a 20 mm-inside diameter was packed at its upper portion with 40 ml of a desulfurization catalyst and at its lower portion with 40 ml of a hydrogen sulfide adsorbent. The catalyst was of 3.0% in NiO, 22% in $MoO_3$ and 75% $Al_2O_3$ each by weight, and the adsorbent was ZnO. A commercial grade of kerosine was contacted at a pressure of 10 kg/cm$^2$G, at a temperature of 380° C., at an LHSV of 1.0 hr$^{-1}$ and at a hydrogen-kerosine ratio of 0.5 Nm$^3$/kg. The kerosine feed was of 74% in $H_2$, 24% in $CO_2$, 1% in CO and 1% in $CH_4$ each by volume, 90 ppm by weight of sulfur, 50° C. in flash point, 0.7903 (14/4° C.) in density and 153° to 260° C. in boiling point. Treated kerosine was reduced in its sulfur content to 4 ppm by weight.

The gaseous mixture was further contacted with 20 ml of a sorbent of 63.7% by weight of Ni, without the addition of steam, by downward passage through the reactor. Reaction conditions were at a pressure of 9 kg/cm$^2$G and at an inlet temperature of 250° C. Upon initiation of the reaction, the reactor revealed hazardous temperature rise, making the test difficult to continue. This was attributed to methane formation noted in Comparative Example 1.

What is claimed is:

1. A process for producing hydrogen from a hydrocarbon feed which is naphtha, kerosene or natural gas, said hydrocarbon feed having sulfur content between 0.5 and 300 ppm by weight, which consists of steps of 1) contacting said hydrocarbon feed with a nickel-containing sorbent in the presence of steam and hydrogen-containing gas at a pressure of lower than 50 kg/cm$^2$G, at a temperature of 250° to 500° C. and at a GHSV of 100 to 5,000 hr$^{-1}$ or at an LHSV of 0.1 to 10 hr$^1$ to obtain a reaction mixture, and 2) subsequently treating said reaction mixture with a steam reforming catalyst in a steam reformer at a pressure of lower than 50 kg/cm$^2$G, at a temperature of 400° to 600° C. at a catalyst bed inlet and 600° to 850° C. at a catalyst bed outlet and recovering reformed gas from the steam reformer.

2. The process according to claim 1 wherein the steam is added in a ratio of steam to carbon of 0.1 to 7.0 mol/atom.

3. The process according to claim 1 wherein the hydrocarbon feed has a sulfur content of smaller than 150 ppm by weight.

4. The process according to claim 1 wherein the hydrocarbon feed is natural gas.

5. The process according to claim 1 wherein the hydrocarbon feed is naphtha or kerosene.

6. The process according to claim 1 wherein the sorbent has a nickel content of 30 to 70% by weight.

7. The process according to claim 1 wherein the catalyst contains nickel as an oxide in an amount of 5 to 50% by weight.

8. The process according to claim 1 further including hydrogenative desulfurization and hydrogen sulfide adsorption prior to contact of the hydrocarbon feed with the sorbent.

9. The process according to claim 8 wherein the hydrogenative desulfurization is accomplished by the use of a desulfurization catalyst.

10. The process according to claim 8 wherein the hydrogen sulfide adsorption is accomplished by the use of an adsorbent.

11. The process according to claim 9 wherein the catalyst is made up of one metal selected from the group consisting of cobalt-molybdenum, nickel-molybdenum, nickel-cobalt-molybdenum and nickel-tungsten.

12. The process according to claim 10 wherein the adsorbent is one member selected from the group consisting of sodium hydroxide, potassium hydroxide, magnesium hydroxide, calcium hydroxide, monoethanolamine, diethanolamine, isopropylamine, zinc oxide, copper oxide, iron oxide-chromium oxide, zinc oxide-copper oxide, zinc oxide-molybdenum oxide and zinc oxide-iron oxide.

13. The process according to claim 1 wherein the mixture from step 1) has a sulfur content of up to 0.2 ppm by weight.

14. The process according to claim 1 wherein part of the reformed gas from step 2) is recycled to step 1).

15. The process according to claim 1 wherein said hydrogen containing gas in step 1) contains CO and $CO_2$ and said CO and $CO_2$ react with said steam and methane formation is prevented.

16. The process according to claim 1 wherein the feed is naphtha and the reaction proceeds for 600 hours or kerosene for up to 10,000 hours.

17. The process according to claim 1 wherein the feed is natural gas and the reaction proceeds for 2,400 hours.

* * * * *